United States Patent
Evans, Jr. et al.

[11] Patent Number: 5,597,418
[45] Date of Patent: Jan. 28, 1997

[54] METHOD OF MAKING FOLDABLE MAT FOR ABSORBING LIQUIDS

[75] Inventors: Raymond D. Evans, Jr., Everett; Timothy R. McMillen, Tyrone; Mark S. Woytowich, Altoona, all of Pa.

[73] Assignee: New Pig Corporation, Tipton, Pa.

[21] Appl. No.: 496,332

[22] Filed: Jun. 29, 1995

Related U.S. Application Data

[62] Division of Ser. No. 315,549, Sep. 30, 1994.

[51] Int. Cl.$^6$ ......................................................... B08B 7/00
[52] U.S. Cl. ................................. 134/6; 134/42; 15/215; 156/302
[58] Field of Search ................................. 134/6, 9, 42, 8; 15/208, 209.1, 210.1, 215–217; 428/43, 124, 131, 137, 166, 167, 409; 156/302, 303, 252, 253, 257, 270

[56] References Cited

U.S. PATENT DOCUMENTS

| | | |
|---|---|---|
| 1,910,810 | 5/1933 | Nash . |
| 3,501,797 | 3/1970 | Nappi .......................... 15/215 |
| 4,199,090 | 1/1980 | Reed ............................ 225/13 |
| 4,245,630 | 1/1981 | Lloyd et al. ................. 128/155 |
| 4,457,964 | 7/1984 | Kaminstein .................. 428/43 |
| 4,587,154 | 5/1986 | Hotchkiss et al. ........... 428/195 |
| 4,617,215 | 10/1986 | Telesco ........................ 428/43 |
| 4,684,562 | 8/1987 | Hartkemeyer ............... 428/182 |
| 4,772,499 | 9/1988 | Greenway .................... 428/43 |
| 4,832,852 | 5/1989 | Wells et al. .................. 210/671 |
| 4,876,135 | 10/1989 | McIntosh ..................... 428/74 |
| 4,888,229 | 12/1989 | Paley et al. .................. 428/192 |
| 4,963,406 | 10/1990 | Gooding et al. ............. 428/43 |
| 5,080,956 | 1/1992 | Smith ........................... 428/166 |
| 5,256,466 | 10/1993 | Berringan et al. ........... 428/166 |
| 5,268,222 | 12/1993 | Honeycutt .................... 428/224 |

FOREIGN PATENT DOCUMENTS 91656  7/1980  Japan .

*Primary Examiner*—Jill Warden
*Assistant Examiner*—Harold Y. Pyon
*Attorney, Agent, or Firm*—Buchanan Ingersoll, P.C.; Michael L. Dever

[57] ABSTRACT

A multilayered flexible sheet for absorbing liquids comprises a nonsegmented flexible layer comprised of woven or nonwoven materials having the capacity to absorb liquids and a segmented flexible layer of woven or nonwoven materials having the capacity to absorb liquids being tacked face-to-face to the nonsegmented layer, the segments of the segmented layer being separated by substantially straight boundaries extending across one dimension of the sheet. The multilayered sheet can be easily folded along the boundaries between the segments of the segmented layer and therefore can be used unfolded as walk on mats, wipes, absorbent pads and response pads or folded as pillows or socks for absorbing liquids.

6 Claims, 3 Drawing Sheets

5,597,418

METHOD OF MAKING FOLDABLE MAT FOR ABSORBING LIQUIDS

This application is a division of application Ser. No. 08/315,549, filed Sep. 30, 1994.

FIELD OF THE INVENTION

This invention pertains to the field of cleaning up and containing liquid spills, leaks, drips and sprays that occur from time to time in industry. In particular, this invention pertains to absorbent materials that are packaged in a compact form for delivery and that address a number of cleanup and containment problems when quickly configured by folding into different widths and thicknesses, for example, into walk on mats, response pads, absorbent pads, pillows, socks and wipes.

BACKGROUND OF THE INVENTION

It is essential that managers and workers in settings where there exists a potential for leaks or spills of toxic and nontoxic liquids be prepared to contain the leaks or cleanup the spills. A number of products have been developed for absorbing liquids from leaks and spills. Usually, each product is directed to a specific type of problem. For example, leaks, splashes and drips of a slippery liquid over a walkway may be addressed by a walk on mat that absorbs the liquid and has an upper surface that is resistant to the wear of foot traffic, The products are also used in nontraffic areas as absorbent pads. Puddles of liquid are often cleaned up by throwing absorbent response pads or pillows on the puddle. The outward flow of a leak or spill is often contained by placing a sock around the outer edges of the liquid to soak up the liquid as it reaches the sock. Drips and sprays are absorbed from surfaces with wipes.

U.S. Pat. No. 5,080,956 entitled "Oil Absorbent Mat With Spill Channeling Means" describes a sheet of absorbent mat having parallel fold lines along the longitudinal axis. The sheet is supplied in a coiled roll. The sheet may be formed into a sock or boom by folding along fold lines. To hold the roll together, the sheet must be stapled by a standard cartridge-loaded stapler. A drawback of this product is that a stapler must be handy in order to form the sheet into a sock or boom. Another drawback of this product is that socks or booms, after use, contain the noncombustible staples which may complicate disposal.

U.S. Pat. No. 5,256,466 entitled "Article for Liquid Containment and Recovery" describes a product comprising a folded sheet wherein the layers are releasably bonded at a fold. Thus, as delivered, the product can be used as a sock or the releasable bonds may be broken to spread the article into an unfolded sheet. Drawbacks of this arrangement are that the packing, storage and shipment are not as convenient as the packing of unfolded coiled sheets. Also, it does not lay flat when opened up and cannot be walked on due to low strength, low cross direction and machine direction strength.

It is an object of this invention to provide a product and method of using the product that can be configured to function as an absorbent walk on mat, wipe, response pad, absorbent pad, pillow or sock by folding into these forms without the use of any mechanical means such as thermal bonding, staples or like metal fasteners and that can be packed and shipped as unfolded rolls or sheets.

It is yet another object of this invention to provide a product comprising a rolled absorbent sheet or stack of sheets with or without, preferably, in combination with, a dispensing container from which it easily pays out.

SUMMARY OF THE INVENTION

Briefly, according to this invention, there is provided a multilayered flexible sheet for absorbing liquids comprising (a) nonsegmented flexible layer(s) comprised of woven or nonwoven materials having the capacity to absorb liquids and (b) segmented flexible layer(s) of woven or nonwoven materials having the capacity to absorb liquids being tacked face-to-face to said nonsegmented layer, the segments of the segmented layer being separated by substantially straight boundaries. The multilayered sheet is easily folded along the boundaries between the segments of the segmented layer as the nonsegmented layer acts like a hinge and therefore can be used folded as pillows or socks without the need for mechanical means to hold the folded segmented layers together and used unfolded as a walk on mat, response pad, absorbent pad or wipe.

Preferably, the multilayered flexible sheet(s) is comprised of at least one wear-resistant flexible sheet tacked to the face of the nonsegmented layer opposite the segmented layer. The wear-resistant sheets are sufficiently porous to allow fluids to pass therethrough and to be absorbed by the segmented and nonsegmented flexible sheet layers while retaining particulate material. Preferably, the multilayered flexible sheet is in the form of long strips with two substantially parallel edges and the boundaries between segments of the segmented layer are substantially parallel to the edges of the strips. Most preferably, perforations in all layers extend substantially perpendicular to the strip edges enabling the strip to be torn apart by hand along the perforations.

According to one embodiment, a rolled or folded multilayered flexible strip for absorbing liquids as already described and a cooperating dispensing container therefor is provided. The container is large enough to hold the rolled or folded strip and has a slot therein from which an end of the rolled multilayered flexible strip may be drawn.

There is also provided a method of using a multilayered flexible strip as a walk on mat. The strip is torn off and placed segmented face down upon a floor subject to foot traffic whereby the strip will absorb liquids and resist the wear of the traffic while protecting against slips and falls.

There is also provided a method of using a multilayered flexible strip as a response pad, absorbent pad or a wipe for absorbing liquids. The strips are torn off and placed in contact with a spill, leak, drip or spray to absorb liquid.

There is provided yet another method of using a rolled multilayered flexible strip as a pillow or a sock for absorbing liquids. A length of strip is torn off, folded along one or more boundaries between segments of the segmented layer and placed in or around a potential or actual source of liquid as a pillow or a sock for preventing the spread of spilled or leaking liquids or absorption of said liquids.

BRIEF DESCRIPTION OF THE DRAWINGS

Further features and other objects and advantages will become clear from the following detailed description made with reference to the drawings, in which.

DESCRIPTION OF THE PREFERRED EMBODIMENTS

Figure 1:
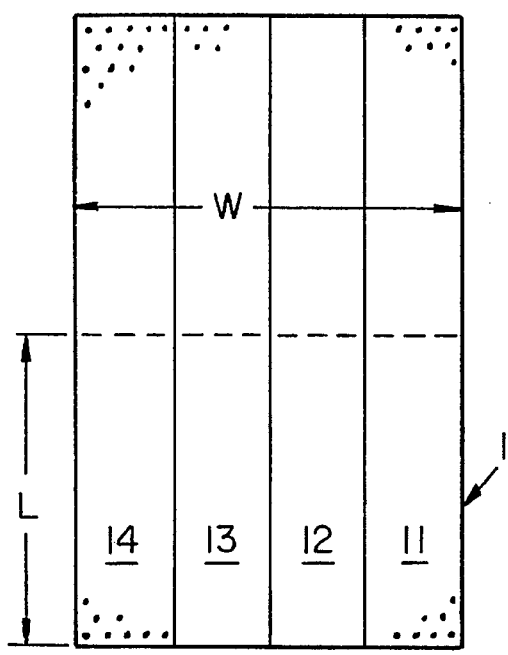
FIG. 1 is a plan view of a section of the multilayered flexible sheet according to this invention.

Referring to FIG. 1, two longitudinal sections of the multilayered flexible sheet 1, according to this invention, are shown looking down upon the segmented layer side thereof. Each layer may be comprised of multiple sublayers. The width W of the sheet 1 may be, for example, 16½ inches. The absorbent sheet segments 11, 12, 13 and 14 are then approximately four inches wide. The length L between perforations extending through all layers permit the sheet 1 to be torn apart in convenient lengths which may, for example, be 20 inches.

Figure 2:
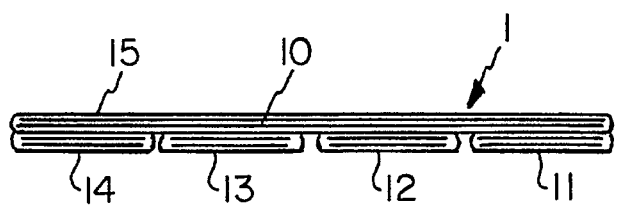
FIG. 2 is an end view of the sheet shown in FIG. 1.

Referring to FIG. 2, the construction of the sheet is shown. A nonsegmented absorbent sheet forms the base layer 10. The segments 11, 12, 13 and 14 of the segmented absorbent layer are attached to the base layer 10. The base layer may be multiple layers of nonsegmented absorbent sheets bonded together. Each layer may be comprised of multiple sublayers. Where the segmented layer is bonded to the nonsegmented layer, there is formed a hinge at the line where the segments of the segmented layer are adjacent to each other. The flexibility of the hinge is insured by the selection of the thickness and flexibility of the nonsegmented layer and the width of the space between the adjacent segments of the segmented layer. The correct combination of thickness and flexibility of the segmented layer and the width of the separation between segments of the segmented layer to insure the hinge action can be determined by simple trial and error.

The segmented and nonsegmented layers comprise any woven, nonwoven or solid sheet webs made from natural materials such as cellulose, wool, etc. and man-made materials such as polyolefins, polyesters, nylons, glass, etc. or other related materials in any combination that would allow the device to be used to absorb, dike, contain, filter fluids or vapors and/or provide a wear-resistant working surface. In addition, any and all of the layers could be hydrophilic or hydrophobic as required by the end use application. Component webs that are naturally hydrophobic can be treated with various surfactants to make them hydrophilic either by surface application and/or by incorporation of the surfactant into the molten polymer stream prior to the nonwoven web forming process or, in the case of woven webs, prior to the production of yarns, filaments, etc. For the webs that are naturally hydrophilic, surface application of various additives such as silicone-based products can be used to make the webs hydrophobic. End use applications may dictate the need for other characteristics such as ultraviolet light resistance, fire resistance, various colors or tints, etc. These and other characteristics known to those skilled in the art can be achieved by surface application and/or by direct polymer addition as discussed above.

The segmented and nonsegmented layers are bonded together. Bonding may be accomplished via hot melt or pressure sensitive adhesive, pin bonding, ultrasonic bonding, chemical bonding, thermal bonding or mechanical bonding.

The product can be modified by the end user, by the use of the preengineered segmented fold lines, to meet various end user requirements of varying height and width. The device has been engineered to allow usage in multiple applications where prior products were application specific.

Referring to FIG. 2, a wear-resistant surface 15 is applied to the nonsegmented side of the sheet 1. The wear-resistant surface may be absorbent surfaces and/or surfaces that allow fluids to pass through while capturing particulate material contained within the fluids.

Figure 3:
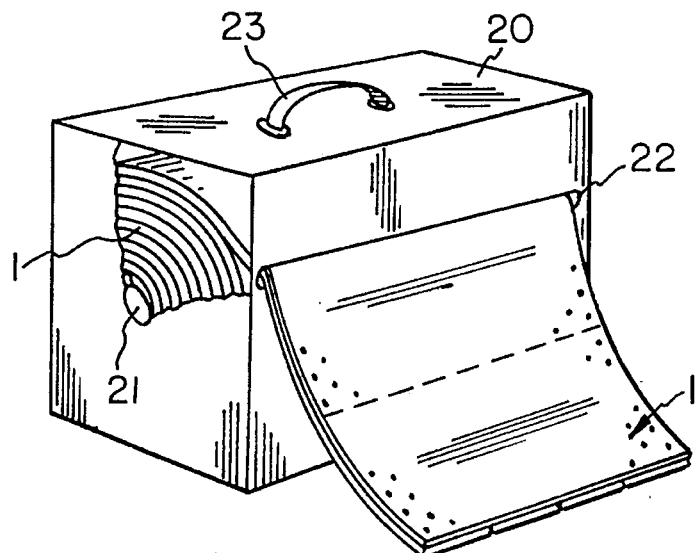
FIG. 3 is a broken away pictorial view of a container for shipping, storing and dispensing the rolled sheet shown in FIG. 1.

Referring now to FIG. 3, there is shown an optional container 20 with a mandrel 21 journaled in the sides thereof about which the multilayered flexible sheet 1 described above is rolled. The container has a slot 22 through which the sheet may be payed off the roll. The container, usually fabricated of cardboard, has a handle 23 for carrying the container to the site of the leak, drip, spray or spill.

In yet another embodiment, no mandrel is journaled in the container but the flexible sheet is folded back and forth (as with an accordion or continuous form computer paper fold) to form a continuous stack and then is placed in the box. A free end of the continuous stack may then be payed out through the slot in the container.

Figure 4:
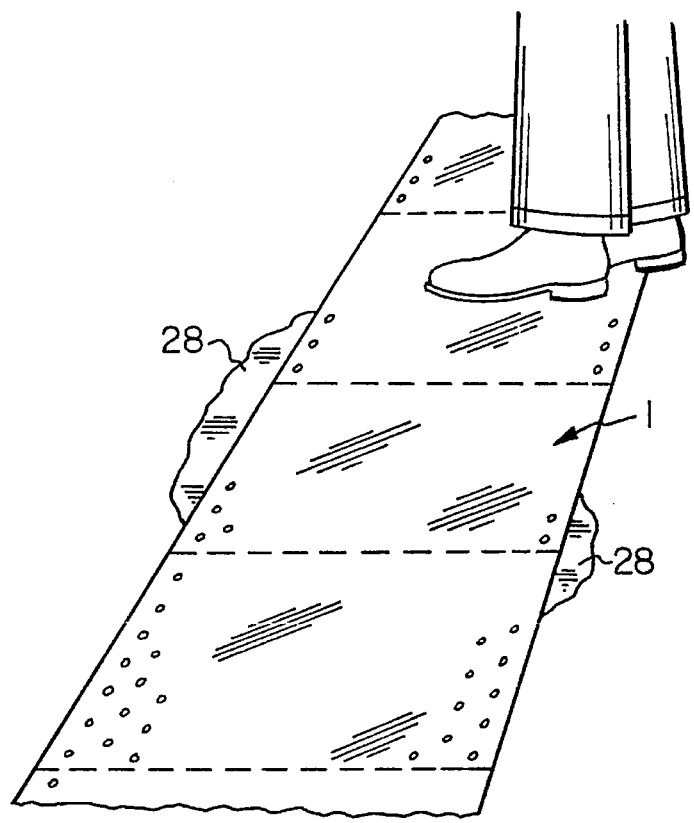
FIG. 4 is a pictorial view illustrating the use of the sheet shown in FIG. 1 as a walk on mat.

Referring to FIG. 4, there is illustrated the use of the multilayered flexible sheet as a walk on mat. The sheet is placed upon the floor with the wear-resistant surface face up.

Figure 5:
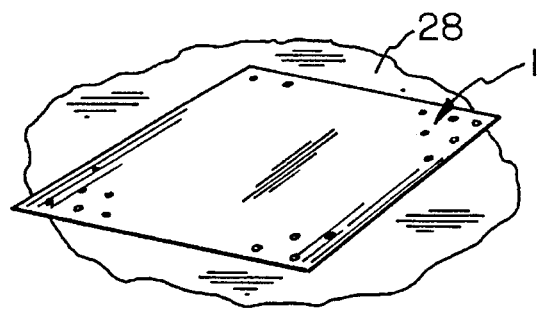
FIG. 5 is a pictorial view illustrating the use of the sheet of FIG. 1 as a response pad.

Referring to FIG. 5, there is illustrated the use of a single section of the multilayered flexible pad as a response pad to soak up a spill.

Figure 6:
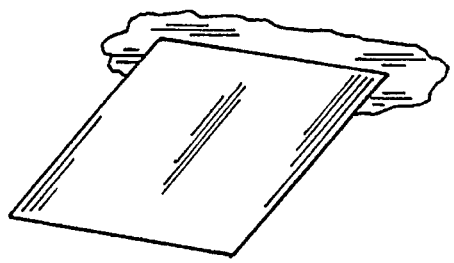
FIG. 6 is a pictorial view illustrating the use of the sheet of FIG. 1 as an absorbent pad.
Figure 7:
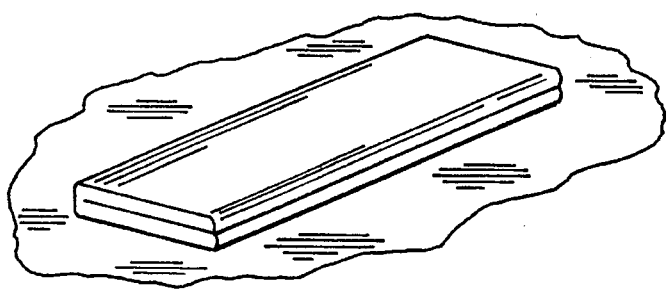
FIG. 7 is a pictorial view illustrating the use of the sheet of FIG. 1 as a pillow.
Figure 8:
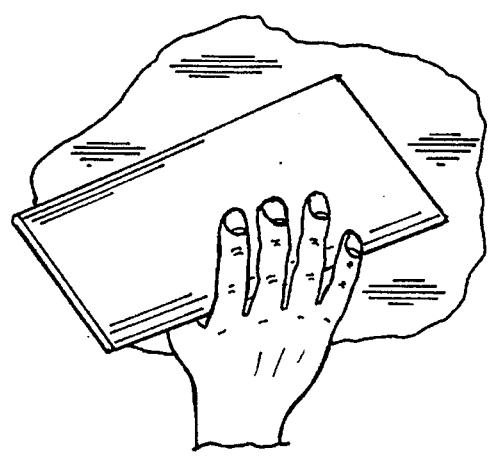
FIG. 8 is a pictorial view illustrating the use of the sheet of FIG. 1 as a wipe.

FIG. 6 illustrates the use of one or more sections of the multilayered flexible pad as an absorbent pad. FIG. 7 illustrates the use of one or more sections of the multilayered flexible pad folded at least once as an absorbent pillow. FIG. 8 illustrates the use of a portion of the multilayered pad as a wipe.

Figure 9:
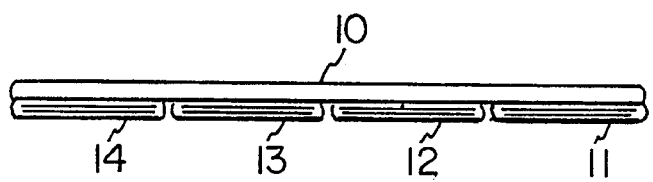
FIG. 9 is an end view of a sheet similar to that shown in FIG. 2 but with no wear surface.

For some applications, a wear-resistant layer is optional, such as a pad, pillow or wipe, and the wear-resistant layer described with reference to FIG. 2 is optional. FIG. 9 shows a construction similar to that shown in FIG. 2 but without the wear-resistant surface applied to the nonsegmented side of the sheet.

Figure 10:
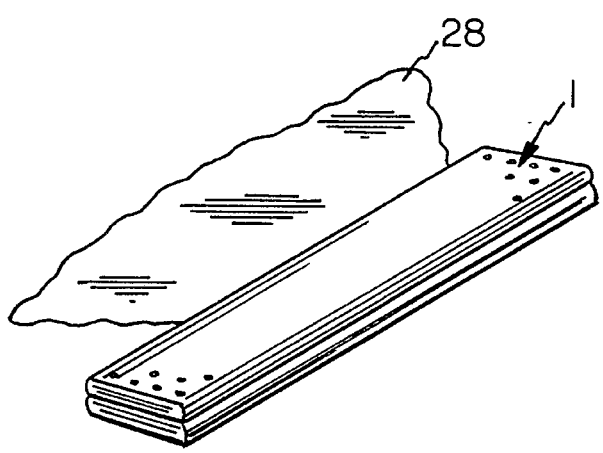
FIG. 10 is a pictorial view illustrating the use of the sheet of FIG. 1 folded into a sock.

Referring to FIG. 10, there is illustrated the use of multiple sections of the multilayered flexible sheet 1 folded into a sock to arrest the spread of a leak or spill. The multilayered sheet can be shipped in sheet form and roll form, each of which can be perforated for end user convenience. However, this invention is not limited to only those configurations. Pillows, socks or any other configuration known to those skilled in the art is within the scope of this invention.

Having thus described our invention with the detail and particularity required by the Patent Laws, what is desired protection by Letters Patent is set forth in the following claims.

We claim:

1. A method of making and using a multilayered flexible strip for walk-on mats for absorbing liquids comprising the steps of:

a. providing a nonsegmented flexible sheet layer comprised of woven or nonwoven fabrics for absorbing liquids;

b. providing a segmented flexible sheet layer comprised of woven or nonwoven fabrics for absorbing liquids, wherein the segments of the segmented layer are separated by substantially straight boundaries extending across one dimension of the sheet;

c. tacking the segmented layer in a face-to-face relationship with the nonsegmented layer, the segmented layer and nonsegmented layer forming a multilayered strip, such that the multilayered sheet is easily folded along the boundaries between the segments of the segmented layer such that the multilayered flexible strip can be used folded without the need for mechanical means to hold the folded segmented layers together;

d. cutting or tearing off a length of the multilayered strip; and e. laying the length of the multilayered strip segmented face down upon a floor subject to foot traffic whereby the length of strip will absorb liquids and protect against slips and falls.

2. The method of claim 1 wherein said multilayered sheet is torn along a perforation line.

3. A method of making and using a multilayered flexible strip as pads, pillows and wipes for absorbing liquids comprising the steps of:

a. providing a nonsegmented flexible sheet layer comprised of woven or nonwoven fabrics for absorbing liquids;

b. providing a segmented flexible sheet layer comprised of woven or nonwoven fabrics for absorbing liquids, wherein the segments of the segmented layer are separated by a plurality of substantially straight boundaries extending across one dimension of the sheet;

c. tacking the segmented layer in a face-to-face relationship with the nonsegmented layer, the segmented layer and nonsegmented layer forming a multilayered strip such that the multilayered sheet is easily folded along the boundaries between the segments of the segmented layer such that the multilayered flexible strip can be used folded without the need for mechanical means to hold the folded segmented layers together;

d. cutting or tearing off a length of the multilayered strip;

e. folding the torn length of strip along at least one of the plurality of boundaries between segments of the segmented layer; and f. placing the folded strip in contact with a spill to absorb liquids.

4. The method of claim 3 wherein said multilayered sheet is torn along a perforation line.

5. A method of making and using a rolled or folded multilayered flexible strip as a sock for absorbing liquids comprising the steps of:

a. providing a nonsegmented flexible sheet layer comprised of woven or nonwoven fabrics for absorbing liquids;

b. providing a segmented flexible sheet layer comprised of woven or nonwoven fabrics for absorbing liquids, wherein the segments of the segmented layer are separated by a plurality of substantially straight boundaries extending across one dimension of the sheet;

c. tacking the segmented layer in a face-to-face relationship with the nonsegmented layer, the segmented layer and nonsegmented layer forming a multilayered strip such that the multilayered sheet is easily folded along the boundaries between the segments of the segmented layer such that the multilayered flexible strip can be used folded without the need for mechanical means to hold the folded segmented layers together;

d. cutting or tearing off a length of the multilayered strip;

e. folding the torn strip along more than one of the plurality of boundaries between segments of the segmented layer; and f. placing the folded strip around a potential or actual source of fluids as a sock for preventing the spread of spilled or leaking liquids.

6. The method of claim 5 wherein said multilayered sheet is torn along a perforation line.

\* \* \* \* \*